(12) United States Patent
Weaver et al.

(10) Patent No.: US 12,033,268 B2
(45) Date of Patent: *Jul. 9, 2024

(54) VOLUMETRIC DYNAMIC DEPTH DELINEATION

(71) Applicant: Intuitive Research and Technology Corporation, Huntsville, AL (US)

(72) Inventors: Olivia G. Weaver, Huntsville, AL (US); Kyle Russell, Huntsville, AL (US); James Roznick, Huntsville, AL (US); Chanler Crowe Cantor, Madison, AL (US); William Marx, Huntsville, AL (US); Michael Yohe, Meridianville, AL (US)

(*) Notice: Subject to any disclaimer, the term of this patent is extended or adjusted under 35 U.S.C. 154(b) by 150 days.

This patent is subject to a terminal disclaimer.

(21) Appl. No.: 17/879,572

(22) Filed: Aug. 2, 2022

(65) Prior Publication Data
US 2023/0042865 A1 Feb. 9, 2023

Related U.S. Application Data

(60) Provisional application No. 63/228,694, filed on Aug. 3, 2021.

(51) Int. Cl.
| | |
|---|---|
| *G06T 15/08* | (2011.01) |
| *G06T 15/04* | (2011.01) |
| *G06T 15/06* | (2011.01) |
| *G06T 15/50* | (2011.01) |
| *G06T 15/60* | (2006.01) |
| *G06T 15/80* | (2011.01) |

(52) U.S. Cl.
CPC .............. *G06T 15/08* (2013.01); *G06T 15/04* (2013.01); *G06T 15/06* (2013.01); *G06T 15/506* (2013.01); *G06T 15/60* (2013.01); *G06T 15/80* (2013.01); *G06T 2210/41* (2013.01)

(58) Field of Classification Search
None
See application file for complete search history.

(56) References Cited

U.S. PATENT DOCUMENTS

| | | | | |
|---|---|---|---|---|
| 11,113,868 | B2* | 9/2021 | Jones | G06T 15/06 |
| 2018/0188538 | A1* | 7/2018 | Bell | G02F 1/13306 |
| 2020/0054398 | A1* | 2/2020 | Kovtun | G16H 40/63 |
| 2020/0175742 | A1* | 6/2020 | Jones | G06T 15/08 |

* cited by examiner

*Primary Examiner* — Nurun Flora
(74) *Attorney, Agent, or Firm* — Angela Holt; Frank M. Caprio; Bradley Arant Boult Cummings LLP

(57) ABSTRACT

A method for visualizing two-dimensional data with three-dimensional volume enables the end user to easily view abnormalities in sequential data. The two-dimensional data can be in the form of a tiled texture with the images in a set row and column, a media file with the images displayed at certain images in time, or any other way to depict a set of two-dimensional images. The disclosed method takes in each pixel of the images and evaluates the density, usually represented by color, of the pixel. The disclosed method evaluates and renders the opacity and color of each of the pixels within the volume. The disclosed method also calculates and creates dynamic shadows within the volume in real time. This evaluation allows the user to set threshold values and return exact representations of the data presented.

22 Claims, 9 Drawing Sheets

VOLUMETRIC DYNAMIC DEPTH DELINEATION

REFERENCE TO RELATED APPLICATIONS

This application claims priority to Provisional Patent Application U.S. Ser. No. 63/228,694, entitled "Volumetric Dynamic Depth Delineation" and filed on Aug. 3, 2021, which is fully incorporated herein by reference.

BACKGROUND AND SUMMARY

Conventional methods for viewing sequential two-dimensional data require the user to view each image in a sequence individually. The user must remember where he or she is in the series of slides relative to the model from which the slides were taken. This limits the user's ability to view the overall picture.

An example of this is the traditional method of viewing medical DICOM (Digital Imaging and Communications in Medicine) images. DICOM images are loaded sequentially into software that allows the user to scroll through using a mouse or keyboard. This method allows for the images to be displayed as only two-dimensional data and many packages display only a single image at a time.

An exemplary method of this kind is known from the blog Shader Bits (https://shaderbits.com/blog/ray-marched-heightmaps). The Shader Bits algorithm produces a volumetric mesh of a cloud using tiled noise textures, a two-dimensional image consisting of multiple images divided into rows and columns, coupled with the density value returned when a virtual ray is traced along an arbitrary vector through the volume representing the space where the cloud is located.

The present disclosure provides a method to visualize two-dimensional data with three-dimensional volume enabling the end user to easily view abnormalities in sequential data. By adapting the algorithm described above, the current software, unlike the prior art, is not concerned with the density from the view of the camera. Instead, the current algorithm focuses on the density of the two-dimensional texture array. This two-dimensional texture array can be in the form of a tiled texture with the images in a set row and column, a media file with the images displayed at certain images in time, or any other way to depict a set of two-dimensional images. The disclosed method takes in each pixel of the images and evaluates the density, usually represented by color, of the pixel. Low-density valued pixels are drawn with reduced opacity, enabling the mesh to show the density of aspects across the image. A second ray march is performed, which enables the mesh to create more granular details. The user can observe the accumulation of density across multiple images and set threshold values and return exact representations of the data presented, instead of a culmination of all data along a ray trace.

For example, medical images consist of bone and soft tissue that are different colors. This will allow the user to create a threshold value or set a range of values to determine how the data is presented, which will allow medical professionals to look for abnormalities, such as: fractures, scarring, cavities, shadows, or tumors.

Since the user has simultaneous access to the two-dimensional tiles while viewing the three-dimensional volume, the user can manipulate the rendered volumetric mesh by adjusting the original tiled texture or texture sequence. This provides the user the ability, which is lacking under current methods, to know where he or she is in the three-dimensional plane when given two-dimensional images.

Since the software is able to colorize the mesh based on Hounsfield units, common PET color scales, accumulated densities, and other methods, the user will also be able to determine distinctions in density across the image.

The shader implemented by the volumetric mesh in the method according to the present disclosure is an improvement over those known in the art. A "shader" is a term used throughout the software community and is the material that is being applied to the mesh. The shader in the method disclosed herein still uses ray marching to calculate density; however, the returned density values are used to influence opacity. In earlier versions of this volumetric shader, for example see U.S. patent application Ser. No. 16/703,012, titled "Rastered Volume Renderer and Manipulator," the opacity of the pixels was always 1.0 (except for air, which was culled from the images). In the new method disclosed herein, the densities are evaluated for each of the pixels and the transparency of these pixels are calculated based on these densities. In other words, the denser the pixel, the more opaque the pixel. By decreasing the opacity of low density values, a sense of depth is applied to the volumetric. This allows the viewer to observe the accumulation of density across multiple images so cavities can be examined in 3D.

Another aspect that is unique to this method disclosed herein is the inclusion of a dynamic directional light source. Since the pixels have transparencies based on their densities, a second ray march is performed to shade the mesh in order to create virtual shadows. This shading allows the user to see concaves of the imagery more easily than before.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

In some embodiments of the present disclosure, the operator may use a virtual controller or other input device to manipulate three-dimensional mesh. As used herein, the term "XR" is used to describe Virtual Reality, Augmented Reality, or Mixed Reality displays and associated software-based environments. As used herein, "mesh" is used to describe a three-dimensional object in a virtual world, including, but not limited to, systems, assemblies, subassemblies, cabling, piping, landscapes, avatars, molecules, proteins, ligands, or chemical compounds.

Figure 1:
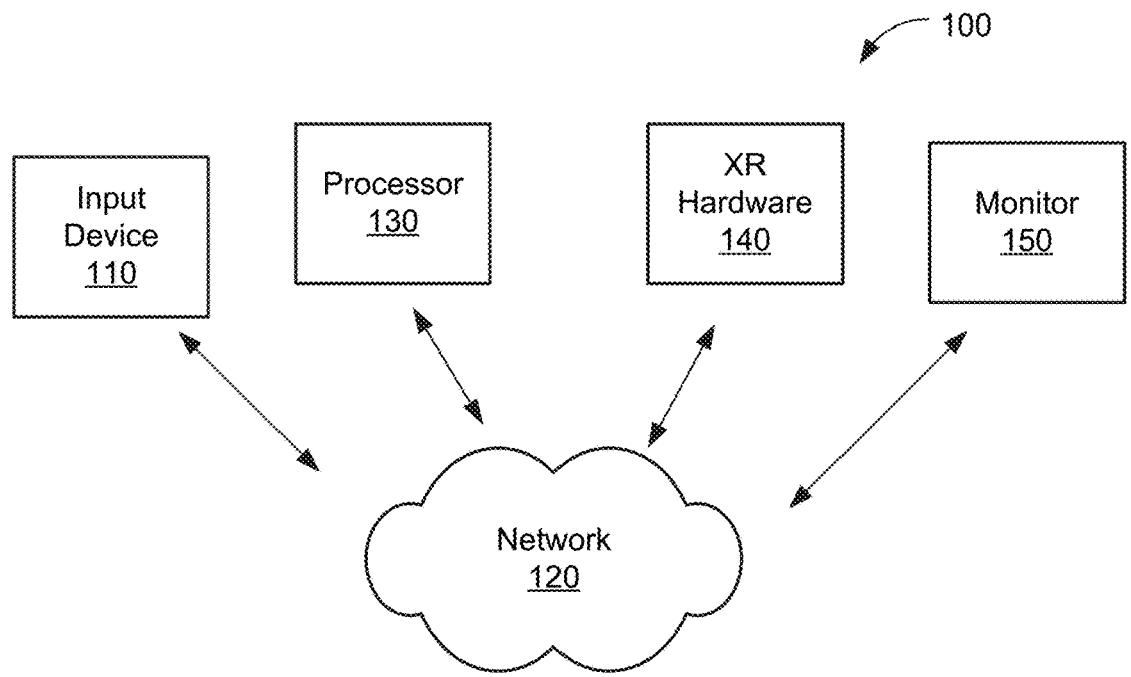
FIG. 1 depicts a system for visualizing sequential two-dimensional data referenced to a three-dimensional model according to an exemplary embodiment of the present disclosure.

FIG. 1 depicts a system 100 for visualizing sequential two-dimensional data referenced to three-dimensional model, according to an exemplary embodiment of the present disclosure. The system 100 comprises an input device 110 communicating across a network 120 to a processor 130. The input device 110 may comprise, for example, a keyboard, a switch, a mouse, a joystick, a touch pad and/or other type of interface, which can be used to input data from a user (not shown) of the system 100. The network 120 may be a combination of hardware, software, or both. The system 100 further comprises XR hardware 140, which may be virtual or mixed reality hardware that can be used to visualize a three-dimensional world. The system 100 further comprises a video monitor 150 is used to display the three-dimensional data to the user. In operation of the system 100, the input device 110 receives input from the processor 130 translates that input into an XR event or function call. The input device 110 allows a user to input data to the system 100, by translating user commands into computer commands.

Figure 2:
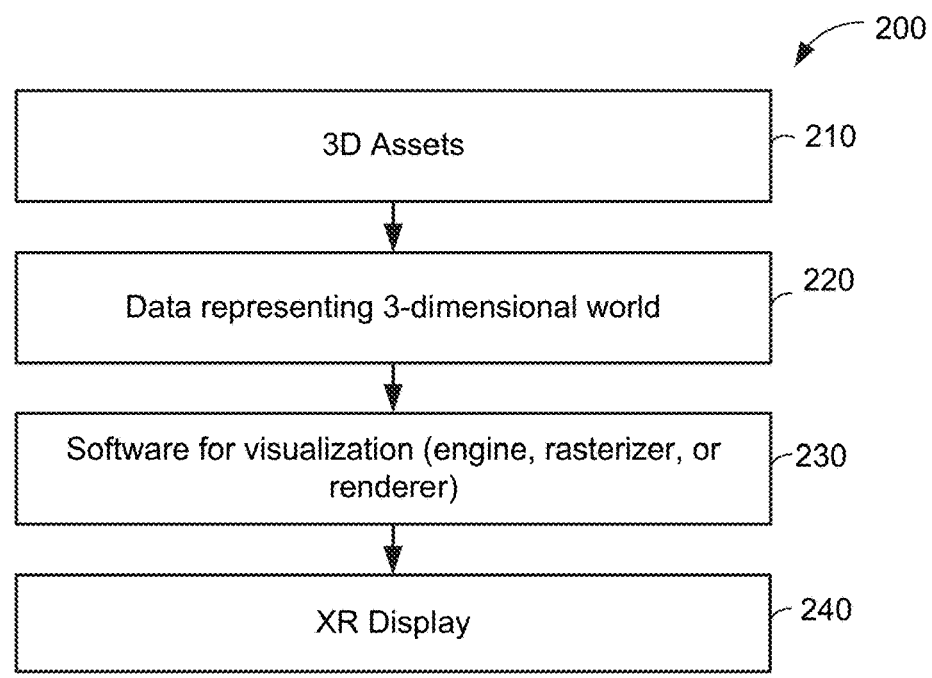
FIG. 2 is a flow diagram depicting a method for representing data in three-dimensional images, according to one embodiment of the present disclosure.

FIG. 2 illustrates the relationship between three-dimensional assets 210, the data representing those assets 220, and the communication between that data and the software, which leads to the representation on the XR platform. The three-dimensional assets 210 may be any three-dimensional assets, which are any set of points that define geometry in three-dimensional space.

The data representing a three-dimensional world 220 is a procedural mesh that may be generated by importing three-dimensional models, images representing two-dimensional data, or other data converted into a three-dimensional format. The software for visualization 230 of the data representing a three-dimensional world 220 allows for the processor 130 (FIG. 1) to facilitate the visualization of the data representing a three-dimensional world 220 to be depicted as three-dimensional assets 210 in the XR display 240.

Figure 3:
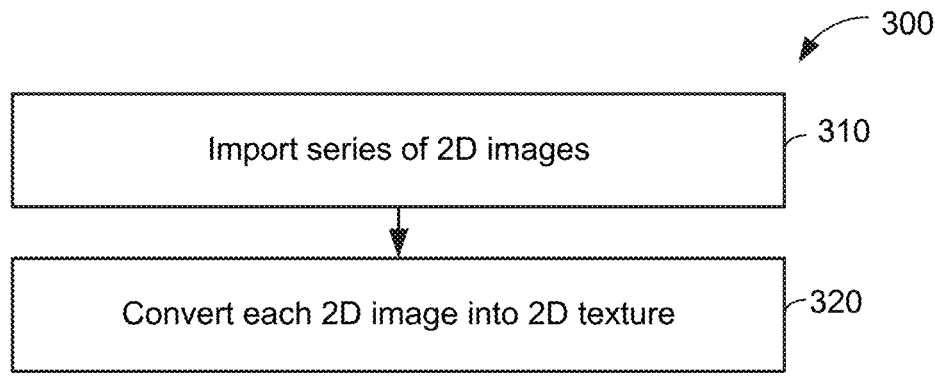
FIG. 3 is a flow diagram depicting a method for importing two-dimensional data.

FIG. 3 depicts a method 300 of data importation and manipulation performed by the system, according to an exemplary embodiment of the present disclosure. In step 310 of the method 300, a series of two-dimensional images is imported. In this regard, a user uploads the series of two-dimensional images that will later be converted into a three-dimensional mesh. The importation step 310 can be done through a GUI interface, copying the files into a designated folder, or other methods. In step 320, each of the two-dimensional images are converted into a two-dimensional texture that can be manipulated by the program.

Figure 4:
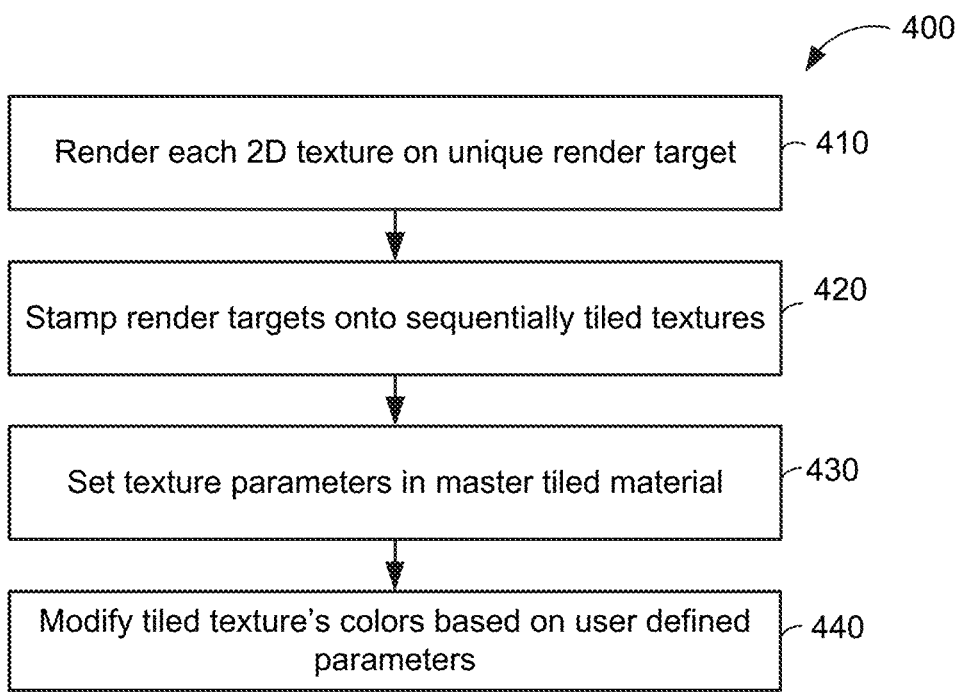
FIG. 4 is a flow diagram depicting a method for creating three-dimensional data from two-dimensional data.

FIG. 4 depicts a method 400 of importing data for manipulation, according to one embodiment of the present disclosure. In step 410, each converted two-dimensional texture is rendered onto a render target. A render target is essentially a texture that is written to at runtime. Render targets store information such as base color. Also in this step, the two-dimensional texture is automatically resized, if needed, to maximize the number of tiles on the render target.

In step 420, the resized two-dimensional texture is added to the tiled texture. This process is done sequentially such that each texture has its own tile. These textures are drawn onto a larger texture in a grid pattern, in order of height. When used herein, the term "height" refers to the distance between two sequential two-dimensional textures, i.e., the distance between images for which there is no image information. This creates a grid of sequential images. Each grid texture is then ordered in sequence by height as well. These grid textures are then referenced to create a stacked image volume.

In step 430 the texture parameters are set in the master tiled material. Thereafter when the system "looks" for pixels, it will use these textures. Shaders in the software manipulate the grid textures so all the tiles show what is desired by cutting out pixels., the colors or accumulated densities of the tiled texture are modified based on user-defined color thresholds.

In step 440, the colors or accumulated densities of the tiled texture are modified based on user-defined color thresholds. In this step, the software goes through the pixels to determine whether the pixel color value meets the defined user color thresholds, which will signal the software to manipulate the pixel by rendering those that do meet the pixel color or density value and leaving those that do not meet the pixel color value invisible. For example, a health care professional may be interested in viewing only bone, and by selecting the desired color or accumulated density parameters, only bone would be visible in the images.

In an exemplary embodiment the user may select a desired upper color threshold, a desired lower color threshold, and a desired brightness. The color thresholds are associated with the density of the materials desired to be viewed.

Figure 5:
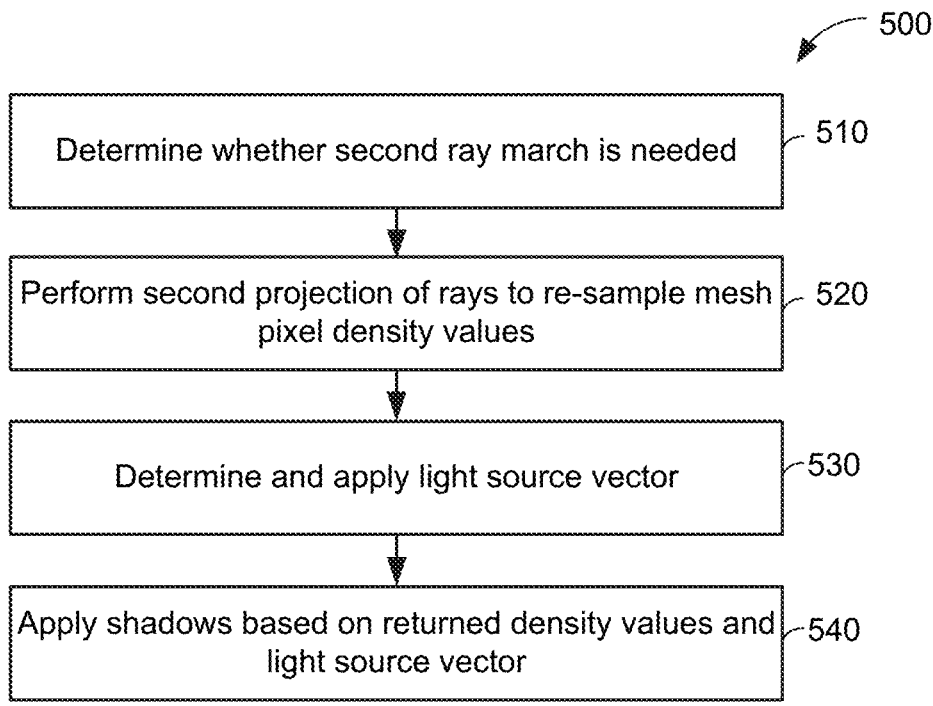
FIG. 5 is a flow diagram depicting a method of performing the secondary ray march used to determine and create directional shadows for the mesh volume.

FIG. 5 depicts a method 500 of creating shadows and light based on returned density values from the ray casting according to an exemplary embodiment of the present disclosure. In step 510, the system determines whether there is a need for a second ray march, via a user-determined threshold. If it is determined that a second ray march is needed, in step 520 a second ray march is returned resulting in a second density sample. In step 530, the user determines whether to apply a stationary light source or a user-manipulated light source vector and applies the light source. The direction of the light source is passed into the volumetric shader as a vector. In step 540, shadows are applied based on the returned density values returned from the ray march and light source vector. In this regard, lighting/shadow calculations are performed depending on the length of the ray for the second ray march. Within this loop, the vector that represents the dynamic light source is used to increment the light position. This incremented value is used to sample the 2D textures. A test is performed with each run of the loop to check if the ray is still within the volumetric box. If it is, once the defined shadow threshold is reached or if the ray has exited the box, the loop will end.

Figure 6:
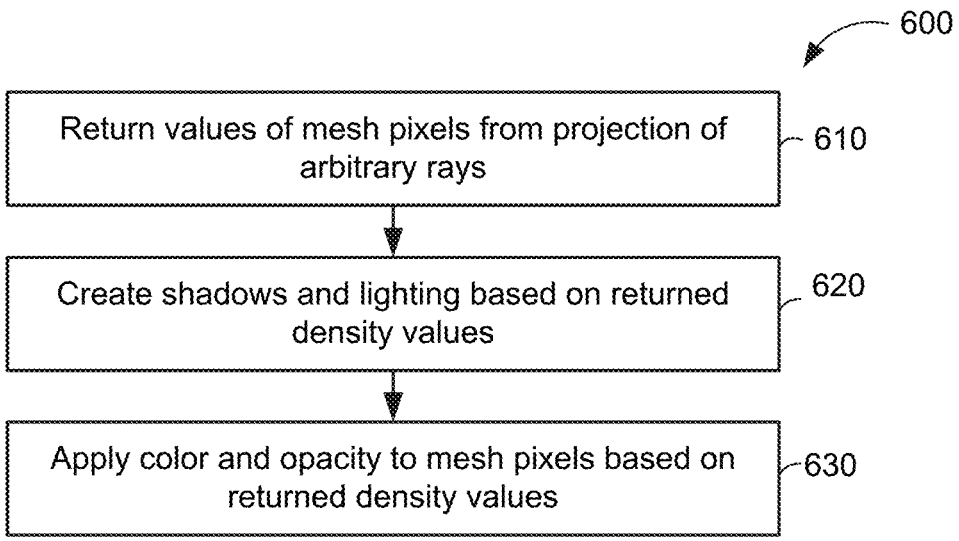
FIG. 6 is a flow diagram depicting a method of manipulating the volumetric mesh created from the ray projection.

FIG. 6 depicts a method 600 of manipulating the volumetric mesh based on the ray projection values, according to an exemplary embodiment of the present disclosure. In step 610, density values from the projected mesh are returned. Smaller density values will result in less opaque pixels. In step 620, shadows are created using the method described above with respect to FIG. 5. In step 630, the density values are then mapped to the color scale based on Hounsfield values, and the pixels are colored according to the color scale and given a calculated opacity based on density. The user can also choose to leave the pixels in greyscale.

Figure 7:
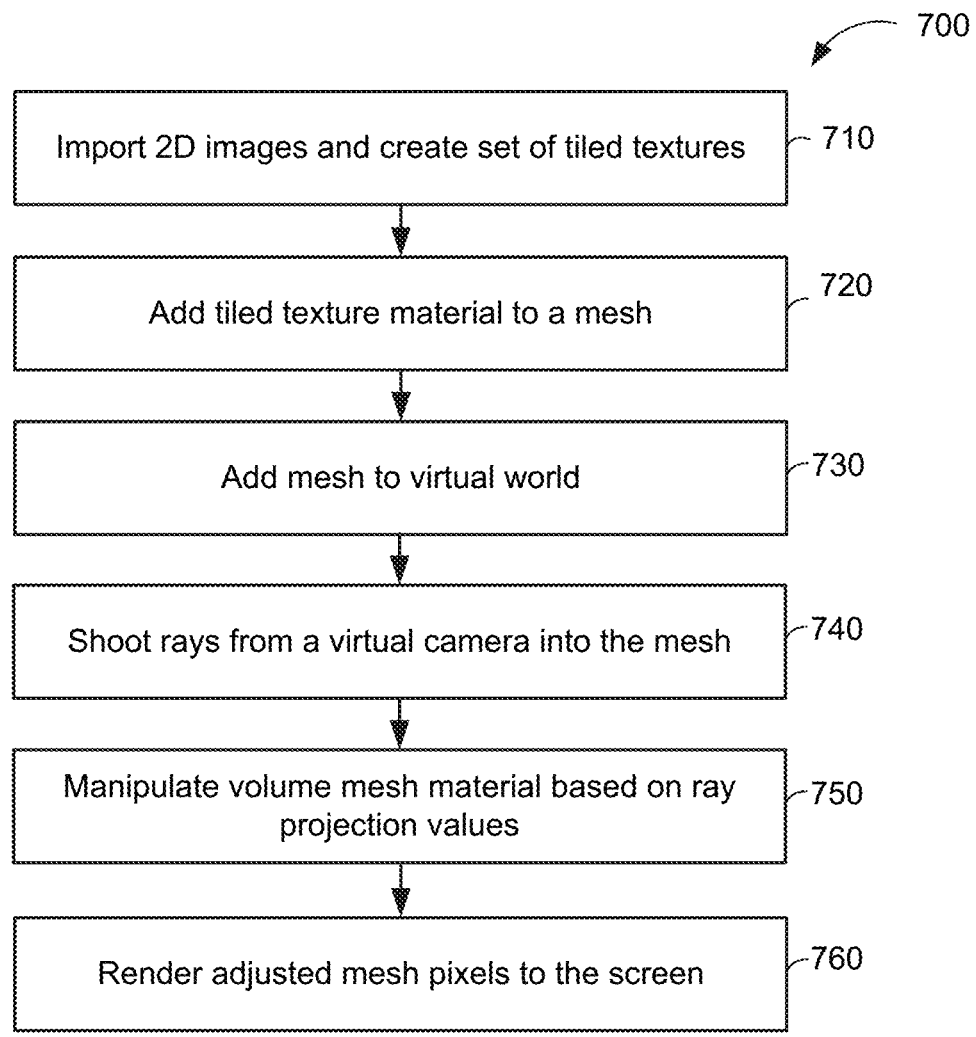
FIG. 7 is a flow diagram depicting a method of implementing the imported tiled texture material and mesh into virtual space for manipulation.

FIG. 7 depicts a method 700 of creating a three-dimensional mesh based on a series of two-dimensional images. In step 710, the software imports the designated images and creates the master material, as depicted in 300 (FIG. 3) and 400 (FIG. 4). In step 720, the master material is applied to a mesh. In step 730, the mesh is added to the virtual world.

In step 740, a virtual camera virtually projects arbitrary rays into the mesh volume from a face of the virtual camera. These rays are oriented away from the camera toward the pixels of the mesh. The rays are then "marched" forward until one of two conditions are met: either a) they collide with a pixel in one of the images that has color, or a) they exit out of the back of the texture without hitting anything, implying that area was empty. The pixel that is returned is then rendered in its full opacity. If a zero alpha channel value is returned, nothing is rendered.

In step 750, the virtually returned rays determine the rendered information in the manner discussed above with respect to FIG. 6. In step 760, adjusted mesh pixels are rendered to the screen. Transparent pixels will be invisible/not rendered.

Figure 8:
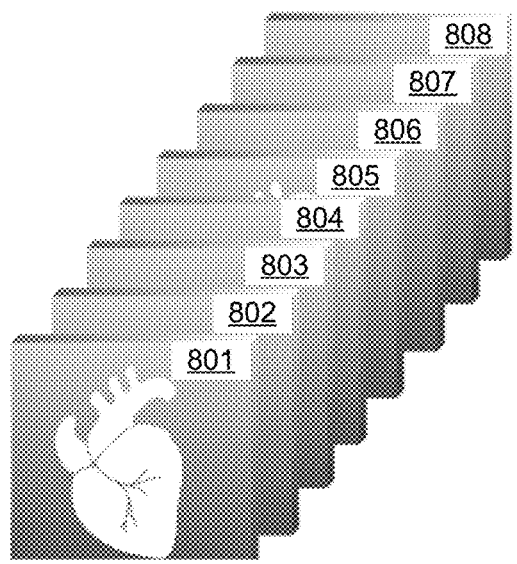
FIG. 8 depicts a grid of rows and columns of tiled textures.
Figure 9:
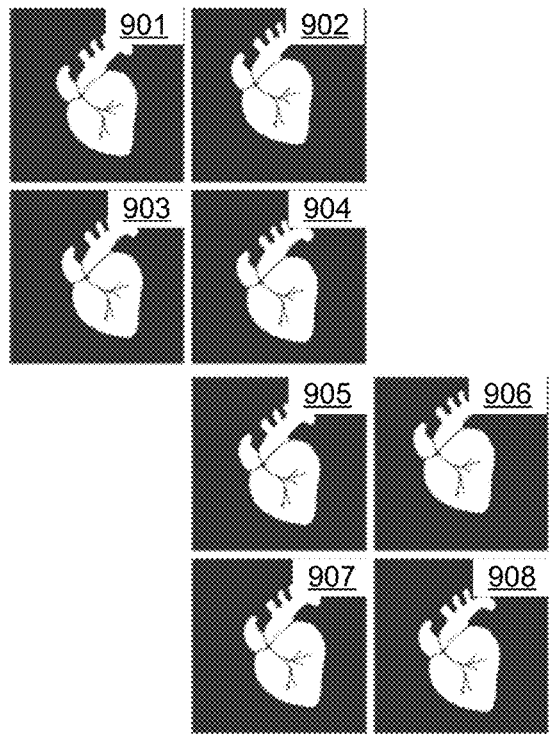
FIG. 9 represents a final layout of the images in sequential order.

FIG. 8 depicts a series of two-dimensional textures 801-808 after step 410 of the method 400, and FIG. 9 depicts a grid of rows and columns of tiled textures 901-908 after step 420 of the method 400. Tiled textures 901-904 represent a first "flip book" of textures and tiled textures 905-908 represent a second "flip book" of textures. The shader that reads textures samples between two consecutive flip books of textures and blends between them.

Figure 10:
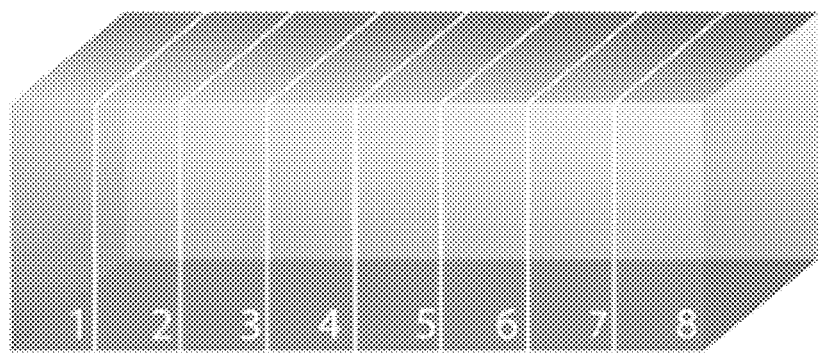

FIG. 10 represents the final layout of the images in sequential order with the new depth dimension extruded and blended between them.

Figure 11:
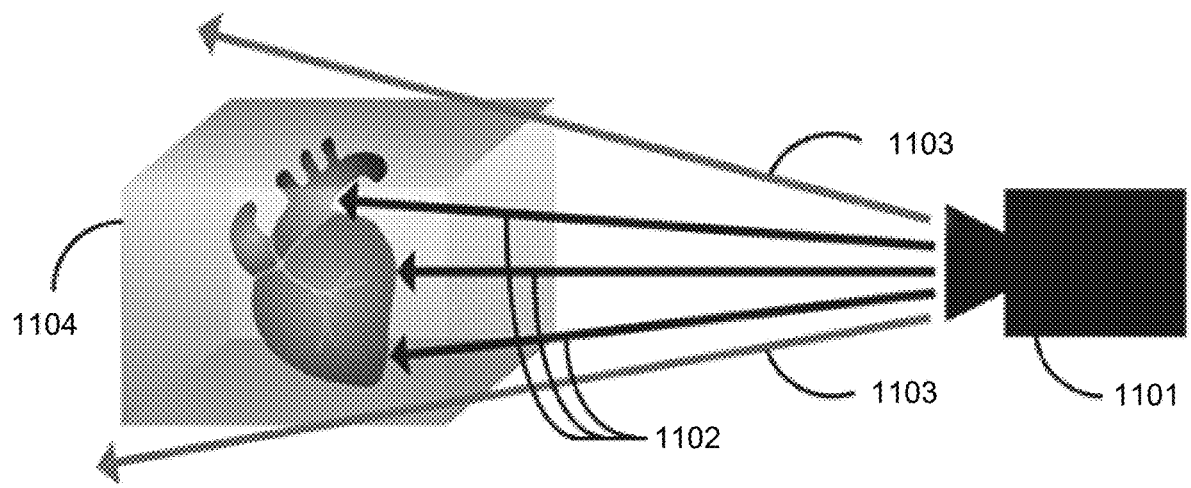
FIG. 11 depicts a virtual camera projecting raster rays into a mesh volume.
Figure 12:
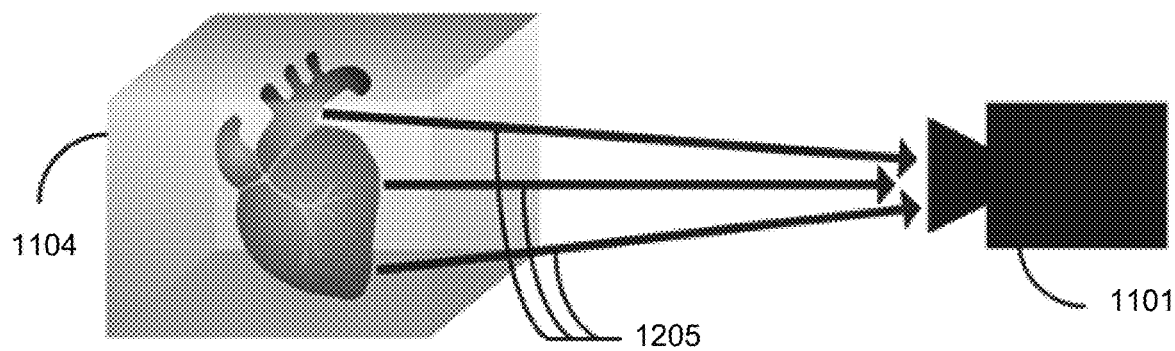
FIG. 12 depicts returned rays from the mesh volume.

FIG. 11 depicts step 740 of FIG. 7, showing a virtual camera 1101 virtually projecting rays 1102 and 1103 into a mesh volume 1104. FIG. 12 depicts returned rays 1205 virtually returned from the mesh volume 1104. The returned result of the ray is the pixel color and alpha channel value of the pixel from the texture or image that was sampled by the ray. The alpha channel value of the pixel represents the opacity of the pixel. The rays will either encounter a valid pixel value 1102 or proceed until the ray 1103 exceeds the mesh volume 1104. Wherever an arrowhead in FIG. 11 ends, a value is returned. If the ray encounters a valid pixel that meets the user-specified threshold, the ray returns the pixel value and the alpha channel value of the encountered pixel to be rendered. If the ray exceeds the volume bounds without encountering a valid pixel value, then the result of the ray contains an alpha channel value of 0 meaning no pixels will be rendered along the direction of the ray. The color and opacity of the encountered pixel is what is returned in FIG. 12.

Figure 13:
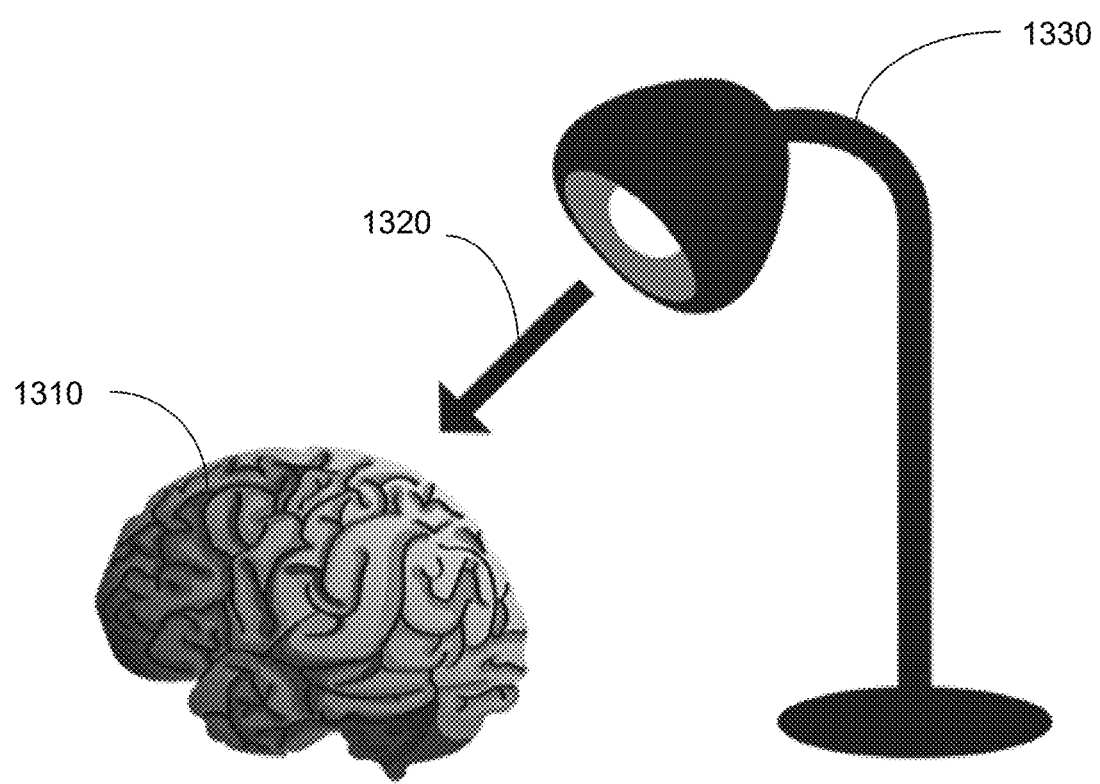
FIG. 13 depicts the virtual light vector.

FIG. 13 depicts the use of a virtual light source 1330 to light the pixels. The virtual light vector 1320 casts shadows in the volumetric mesh 1310. The virtual light vector 1320 is cast from the virtual light source 1330 towards the volumetric mesh 1320. The virtual light source 1330 can be manipulated and moved by the user or the software.

Figure 14:
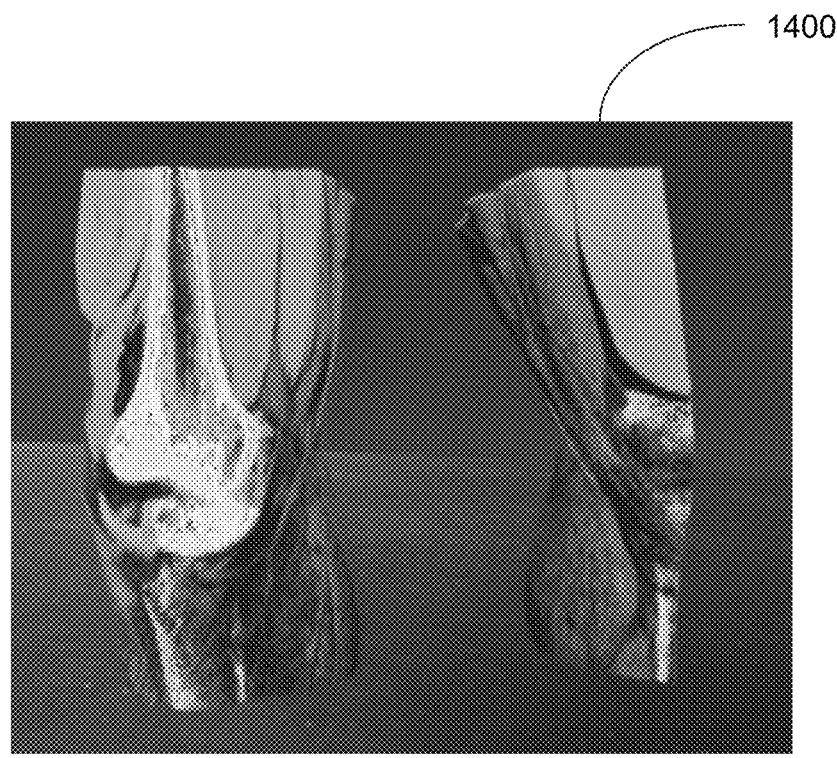
FIG. 14 is an exemplary image of a patient's knees created using the method disclosed herein, with the image displayed in color.

FIG. 14 is an exemplary image 1400 of a patient's knees created using the method disclosed herein, with the image displayed in color.

Figure 15:
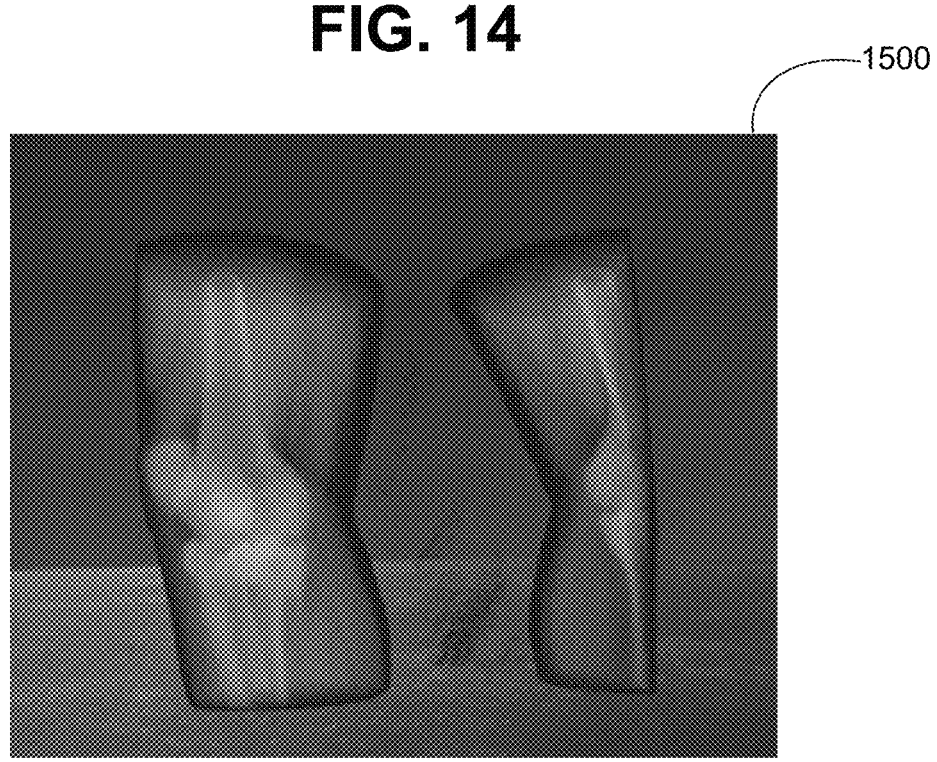
FIG. 15 is an exemplary image of a patient's knees created using the method disclosed herein, with the image displayed in black and white, as in a traditional X-ray.

FIG. 15 is an exemplary image 1500 of a patient's knees created using the method disclosed herein, with the image displayed in black and white, as in a traditional X-ray.

Figure 16A:
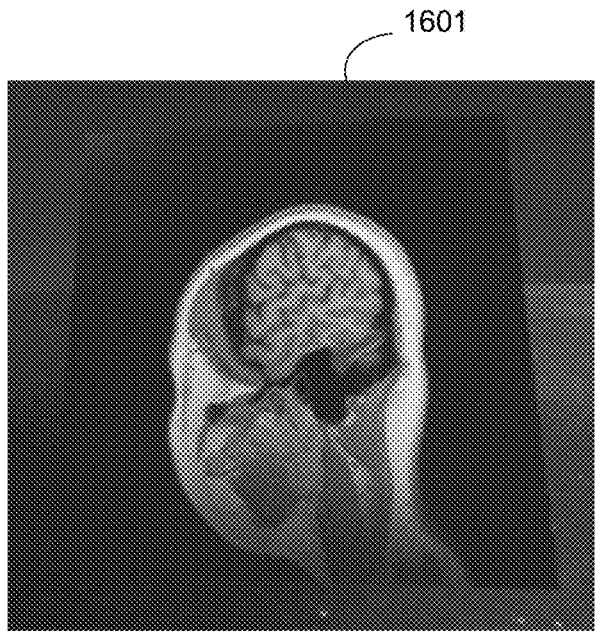
FIG. 16A is an exemplary image of a patient using prior art imaging techniques.
Figure 16B:
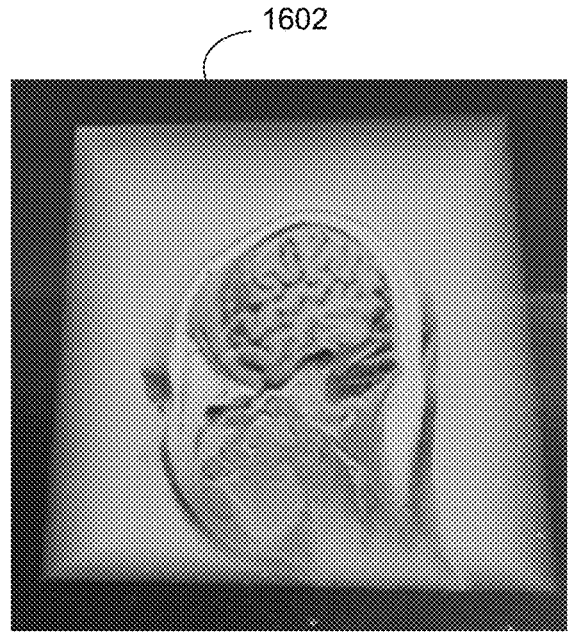
FIG. 16B is an exemplary image of a patient using the method according to the present disclosure.

FIG. 16A is an exemplary image 1601 of a patient using prior art imaging techniques. FIG. 16B is an exemplary image 1602 of a patient using the method according to the present disclosure. As can be seen in comparing these two images, dynamic shadows are rendered in FIG. 16B which allows the user to see more definition of the images.

Figure 17A:
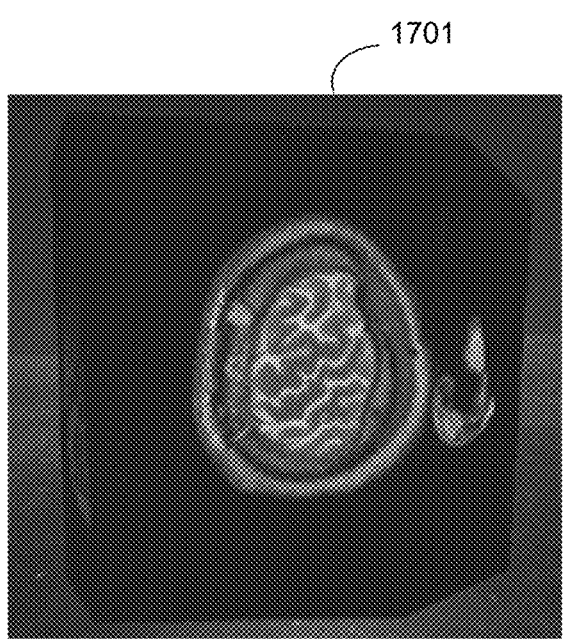
FIG. 17A is another exemplary image of a patient using prior art imaging techniques.
Figure 17B:
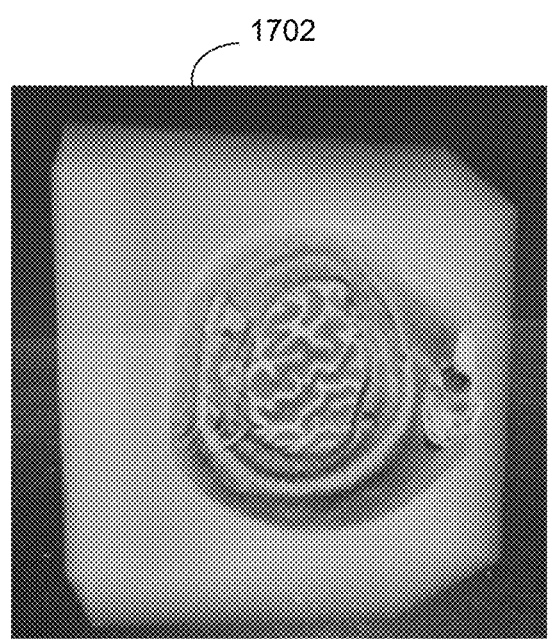
FIG. 17B is another exemplary image of a patient using the method according to the present disclosure.

FIG. 17A is another exemplary image 1701 of a patient using prior art imaging techniques. FIG. 17B is another exemplary image 1702 of a patient using the method according to the present disclosure, provided for comparison purposes.

What is claimed is:

1. A method for displaying sequential two-dimensional data referenced to a three-dimensional representation, the method comprising:
   converting two-dimensional images into two-dimensional image textures;
   rendering the two-dimensional image textures onto render targets;
   stamping render targets onto sequentially tiled textures;
   using a dynamic light source to light the pixels with a second ray march;
   determining the density of the pixels based on the second ray march; and
   setting texture parameters in master tiled material.

2. The method of claim 1, further comprising adding the master tiled material to a mesh.

3. The method of claim 2, further comprising adding the mesh to a virtual display.

4. The method of claim 3, further comprising colorizing the mesh based on opacity and color scale to create a volumetric version of images.

5. The method of claim 4, further comprising virtually projecting arbitrary rays into the mesh from a face of a virtual camera and displaying, on a display, returned ray values from an intersection of the arbitrary rays with color pixels from the mesh.

6. The method of claim 5, wherein the returned ray values are displayed on the display in a calculated opacity, and wherein where no color is returned on a returned ray, nothing is rendered on the display.

7. The method of claim 5, wherein each tiled texture comprises a section of the mesh, and the spaces between each tiled texture are blended.

8. The method of claim 1, wherein the step of stamping render targets onto sequentially tiled textures further comprises drawing images onto a larger texture in a grid pattern, in order of height, creating a grid of sequential images.

9. The method of claim 8, wherein the step of stamping render targets onto sequentially tiled textures further comprises referring the grid of sequential images to create a stacked image volume.

10. The method of claim 1, wherein the step of modifying the colors of each tiled texture based on user-defined parameters further comprises determining, for each pixel, whether a pixel color value is within a user-defined color range and coloring the pixels that are within the user-defined color range and leaving the pixels that are not within the user-defined color range invisible.

11. The method of claim 1, wherein the direction of the dynamic light source is represented by a vector.

12. The method of claim 11, wherein the vector is used to calculate the shadows and shadow density and opacity.

13. The method of claim 12, wherein the calculated shadows are used to color the pixels.

14. A method for displaying sequential two-dimensional data referenced to a three-dimensional representation, the method comprising:
  converting two-dimensional images into two-dimensional image textures;
  rendering the two-dimensional image textures onto render targets;
  stamping render targets onto sequentially tiled textures;
  using a ray march to accumulate texture samples;
  using texture samples to create density value;
  using a dynamic light source to receive an intensity value;
  determining the density based on the accumulated samples from the ray march to scale the brightness up or down.

15. The method of claim 14, further comprising adding the master tiled material to a mesh.

16. The method of claim 15, further comprising adding the mesh to a virtual display.

17. The method of claim 15, further comprising shading the mesh to create a volumetric version of images.

18. The method of claim 17, further comprising virtually projecting arbitrary rays into the mesh from a face of a virtual camera and displaying, on a display, returned ray values from an intersection of the arbitrary rays with color pixels from the mesh.

19. The method of claim 18, wherein the returned ray values are displayed on the display with a calculated opacity, and wherein where no color is returned on a returned ray, nothing is rendered on the display.

20. The method of claim 19, wherein each tiled texture comprises a section of the mesh, and the spaces between each tiled texture are blended.

21. The method of claim 14, wherein the step of stamping render targets onto sequentially tiled textures further comprises drawing images onto a larger texture in a grid pattern, in order of height, creating a grid of sequential images.

22. The method of claim 21, wherein the step of stamping render targets onto sequentially tiled textures further comprises referring the grid of sequential images to create a stacked image volume.

* * * * *